Feb. 12, 1952

M. CAMRAS

COMPENSATING DEVICE FOR A MAGNETIC RECORDING-REPRODUCING HEAD

Filed Nov. 22, 1947

2,584,984

Inventor
MARVIN CAMRAS by The Firm of Carroll [illegible] Attys.

Patented Feb. 12, 1952

2,584,984

UNITED STATES PATENT OFFICE 2,584,984

COMPENSATING DEVICE FOR A MAGNETIC RECORDING-REPRODUCING HEAD

Marvin Camras, Chicago, Ill., assignor to Armour Research Foundation of Illinois Institute of Technology, Chicago, Ill., a corporation of Illinois Application November 22, 1947, Serial No. 787,523

2 Claims. (Cl. 179—100.2)

This invention relates to an electromagnetic transducer head, and more particularly, to an electromagnetic transducer head having a hum reducing arrangement.

Considerable difficulty has often been experienced in magnetic recording and reproducing apparatus due to hum produced during the playback operation which has been produced by stray fields in the vicinity of the head.

Various efforts have been made in the past to reduce or eliminate this hum, and extensive efforts have been made to shield the head. Theoretically, it is possible to balance out the hum by having a coil and head arrangement in which the stray field induces hum voltages which are in opposition to each other without substantially interfering with the signal voltages. From a practical standpoint, however, the arrangements of the prior art have not been able to achieve this theoretical balance, and for that reason the hum still remains an objectionable feature in magnetic reproducing apparatus.

One of the principal features and objects of the present invention is to provide a novel arrangement for substantially eliminating hum produced by stray fields.

A further object of the present invention is to provide a novel electromagnetic transducer head with a hum reducing arrangement.

Another object of the present invention is to provide a novel core structure for an electromagnetic transducer head.

Another and further object of the present invention is to provide a novel magnetic circuit for an electromagnetic transducer head.

Another and still further object of the present invention is to provide an electromagnetic transducer head with a core having an adjustable iron path.

The novel features which I believe to be characteristic of my invention are set forth with particularity in the appended claims. My invention itself, however, both as to its manner of construction, method of operation, together with further objects and advantages may best be understood by reference to the following description taken in connection with the accompanying drawing, in which:

Figure 1:
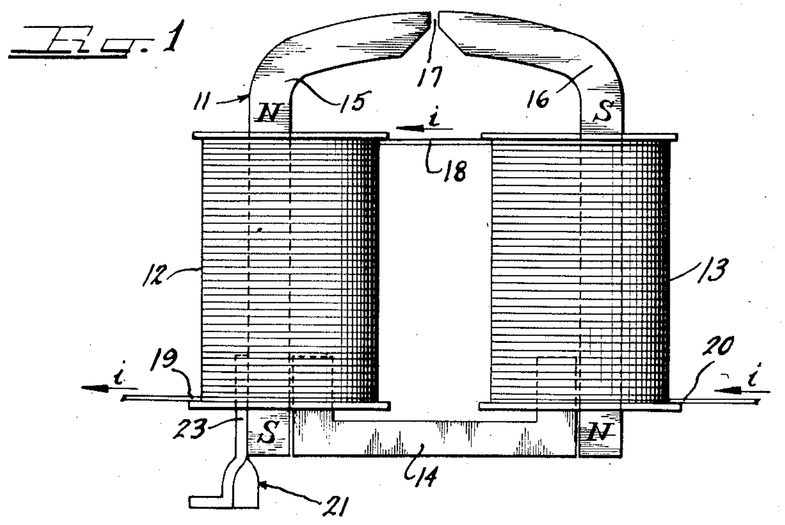
Figure 1 is a diagrammatic elevational view of an electromagnetic transducer head embodying the novel teachings and principles of the present invention.
Figures 2, 3, 4:
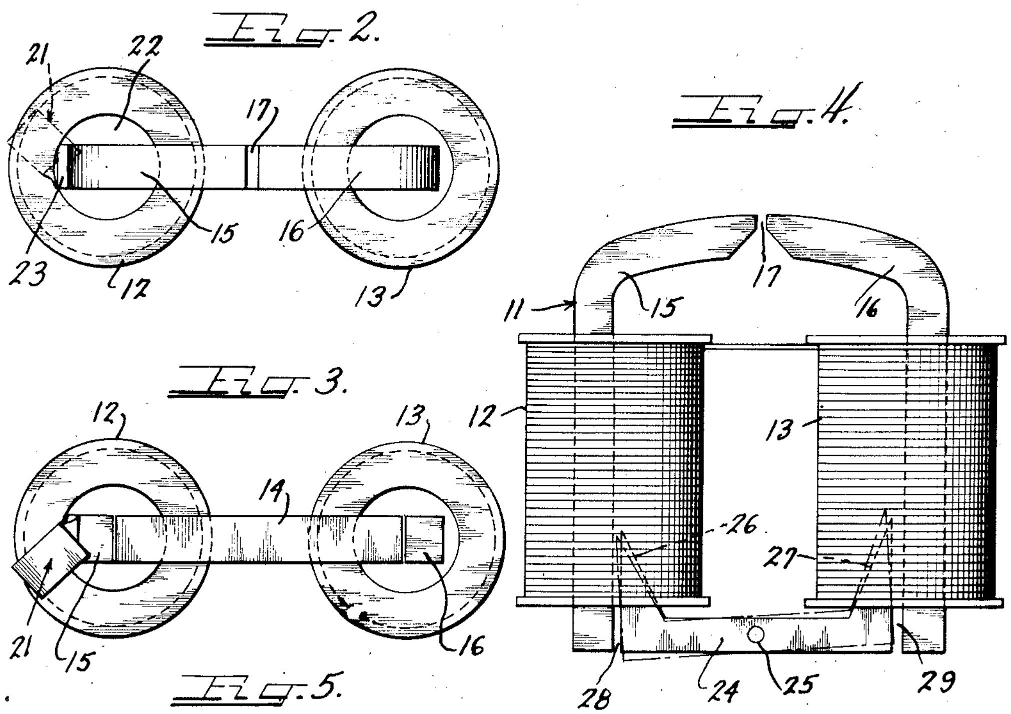
Figure 2 is a plan view of the electromagnetic transducer head shown in Figure 1.
Figure 3 is a bottom view of the electromagnetic transducer head shown in Figure 1.
Figure 4 is a front elevational view similar to Figure 1 illustrating the different embodiment of the present invention.

Referring now to the form of the invention illustrated in Figures 1 to 3 of the drawings, the electromagnetic transducer head shown therein includes a core 11 and a pair of signal coils 12 and 13. The core 11 includes a base portion 14 and two inverted L-shape members 15 and 16, the short legs of the L-shape members 15 and 16 being turned toward each other, and forming a relatively small gap 17 across which a magnetic record member is arranged to pass.

The two coils 12 and 13 are wound in opposite directions and serially connected by conductor 18, the opposite ends of the coils being connected through conductors 19 and 20 to the amplifier (not shown) of the magnetic recorder. The respective polarities of the pole pieces are indicated in Figure 1 for a case that the recording current, *i*, is passing in the direction of the arrows.

Theoretically, the arrangement of the coils on the head in this manner should balance out the hum. Due to the fact that any external fields will thread the coils 12 and 13 in the same direction, the induced voltages produced by the stray fields will be in opposition to each other, and hence, by using similar coils wound in opposite directions, the hum voltages should cancel out if the magnetic circuit is adjusted properly. This is not the case in practice, however, due to the fact that stray fields are not usually uniform, but frequently have portions which are stronger in the vicinity of one coil than in the vicinity of the other coil. Under such circumstances, the hum voltage induced in one coil will not be the same as that induced in the other coil, and the result is that the hum is not canceled out.

For example, the external field threading the right-hand coil 13 may be more dense than that threading the left-hand coil 12. The induced voltage in the coil 13, due to this stray field, will therefore be stronger than that induced in the coil 12 and will not balance out. If some additional ferromagnetic material, such as the insert 21, is added centrally of the coil 12 where the less dense field exists, some additional magnetic lines of force are drawn into the region where the field threads the coil 12, thus increasing the induced voltage in coil 12 produced by the stray field.

An equally effective method of balancing is obtained by adding additional ferromagnetic material exterior of the coil which lies in the more dense magnetic field, for such a piece of material will have the effect of drawing some of the magnetic lines of force out of such a coil, thereby weakening the field of that coil. In effect, the above results are obtained by adding an additional low reluctance path exterior of the coil and varying the position of this low reluctance path in the region of a particular coil.

In accordance with the teachings of the present invention, the hum is greatly reduced or completely eliminated by thus providing means for adjustably balancing one side of the magnetic head to compensate for the non-uniformity of the magnetic fields threading the two coils.

In the embodiment illustrated in Figures 1 to 3 of the drawing, this is accomplished by the adjustable insert 21 which is adjustably positioned either angularly or axially within the open end 22 of the coil 12. The insert 21 is conveniently L-shape in form and includes a leg portion 23 which may be moved in and out of the opening 22 or twisted therein and the desired balance is obtained.

When the head is mounted in a magnetic reproducing apparatus, stray fields, such as the stray field of the motor, will cause a hum to be picked up by the coils 12 and 13. Any unbalance in the stray field as between the coils 12 and 13 is compensated for by adjustably positioning the insert 21 in either the coil 12 or the coil 13, depending upon which lies in the weaker portion of the stray field. This substantially eliminates all hum, since the differential of the voltages which would otherwise be produced in the coils 12 and 13 is eliminated by either relatively increasing or relatively decreasing the voltage induced in the coil 12. It has been found in practice that substantially all hum due to stray fields may be eliminated by this arrangement.

In Figure 4 of the drawing, I have illustrated a modified form of the present invention wherein a pivotally mounted base portion 24 is employed with the L-shape legs 15 and 16 of the core 11 to vary the relative reluctance of the stray field path through coil 12 as compared with that through coil 13. This eliminates the necessity of a separate piece of ferromagnetic material such as the insert 21 of Figure 1.

As shown in Figure 4 of the drawing, the base 24 is pivoted as at 25 and includes two upwardly tapered portions 26 and 27. It will be observed that in this form of the invention, there is a slight air gap 28 between the L-shape leg 15 and the base 24, and also a small air gap 29 between the L-shape leg 16 and the base 24. The manner in which the reluctances of the magnetic circuit are varied will be apparent from an inspection of Figure 4. When a head such as that shown in Figure 4 is mounted on a magnetic reproducing apparatus, the base portion 24 is rocked until a position is obtained which substantially eliminates hum.

Figure 5:
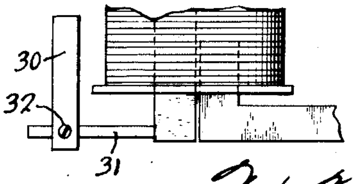
Figure 5 is a fragmentary elevational view of an electromagnetic transducer head of the general type shown in Figure 1, but illustrating a third embodiment of the present invention.

In Figure 5, a further embodiment of the present invention has been illustrated wherein a piece 30 of ferromagnetic material is adjustably shifted exteriorly of the coil in the denser stray field. As the piece 30 is moved toward the coil 12, more of the lines of force of the stray field lie outside of the coil because of the lowering of the reluctance of the path outside of the coil. The bar 30 is mounted on an arm 31 carried by the core 11 and is adjustably held in place by a set screw 32 or other suitable clamping means.

While I have shown preferred embodiments of my invention, it will, of course, be understood that I do not wish to be limited thereto, since many modifications may be made, and I, therefore, contemplate by the appended claims to cover all such modifications that fall within the true spirit and scope of my invention.

I claim as my invention:

1. An electromagnetic transducer head comprising a core having a pair of spaced confronting pole portions, a pair of signal coils mounted on said core and having opposite magnetic orientation, said core including said pole portions forming a series magnetic circuit through said coils, and a reluctance varying member of magnetic material slidably mounted along one leg of said core and extending partially into one of said coils.

2. An electromagnetic transducer head comprising a core having a pair of spaced confronting pole portions, a pair of signal coils mounted on said core and having opposite magnetic orientation, said core including said pole portions forming a series magnetic circuit through said coils, and a reluctance varying member of magnetic material slidably mounted along one leg of said core and extending partially into one of said coils for adjustable movement axially of said coil.

MARVIN CAMRAS.

REFERENCES CITED

The following references are of record in the file of this patent:

UNITED STATES PATENTS

| Number | Name | Date |
|---|---|---|
| 265,485 | Cochran | Oct. 3, 1882 |
| 1,548,596 | Ghegan | Aug. 4, 1925 |
| 2,317,199 | Kirschbaum | Apr. 20, 1943 |
| 2,351,003 | Camras | June 13, 1944 |
| 2,373,998 | Burgwin | Apr. 17, 1945 |
| 2,483,123 | Clapp | Sept. 27, 1949 |
| 2,488,443 | Sonnemann | Nov. 15, 1949 |
| 2,493,742 | Begun | Jan. 10, 1950 |
| 2,497,652 | Bazley | Feb. 14, 1950 |

FOREIGN PATENTS

| Number | Country | Date |
|---|---|---|
| 622,623 | Germany | Dec. 2, 1935 |
| 725,830 | Germany | Sept. 30, 1942 |
| 808,389 | France | Feb. 4, 1937 |